United States Patent

Solie et al.

[11] Patent Number: 5,955,851
[45] Date of Patent: Sep. 21, 1999

[54] BRUSHLESS DC MOTOR PWM SCHEME FOR QUIET COMMUTATION

[75] Inventors: Eric M. Solie, Durham, N.C.; Robert A. Williams, Louisville, Colo.

[73] Assignee: Harris Corporation, Melbourne, Fla.

[21] Appl. No.: 09/014,844

[22] Filed: Jan. 28, 1998

[51] Int. Cl.⁶ ..................................................... H02P 6/14
[52] U.S. Cl. ........................... 318/254; 318/439; 318/722
[58] Field of Search ..................................... 318/138, 254, 318/432, 433, 439, 720, 721, 722, 724

[56] References Cited

U.S. PATENT DOCUMENTS

| | | | |
|---|---|---|---|
| 5,014,016 | 5/1991 | Anderson | 330/10 |
| 5,569,989 | 10/1996 | Acquaviva | 318/254 |
| 5,600,218 | 2/1997 | Holling et al. | 318/439 |
| 5,614,797 | 3/1997 | Carobolante | 318/432 |
| 5,642,247 | 6/1997 | Giordano | 318/434 X |
| 5,668,449 | 9/1997 | Carobolante | 318/254 |
| 5,821,714 | 10/1998 | Williams | 318/439 |
| 5,825,145 | 10/1998 | Pham et al. | 318/439 |

*Primary Examiner*—Bentsu Ro
*Attorney, Agent, or Firm*—Jaeckle Fleischmann & Mugel, LLP

[57] ABSTRACT

The present invention is a brushless dc motor driver system for quiet commutation of current from one load winding to another load winding. The system comprises a first circuit, a second circuit and a third circuit. Each circuit comprises an upper field effect transistor connected at one end to a voltage source and at its other end to a junction of a corresponding lower field effect transistor and a load. The system further comprises a resistor electrically connected to each lower transistor. The resistor generates a signal representative of the total current of the three circuits. The system also comprises a pulse width modulator electrically connected to each field effect transistor. The modulator controls the commutation system. The modulator comprises a comparing means, a responsive means, a gate slew and a determining means. The comparing means measures the total current signal to a reference signal and generates a first signal that indicates whether the total current signal exceeds a predetermined ratio to the reference signal. The responsive means responds to the first signal and generates a second signal that indicates whether the system is commutating. The second signal also maintains a substantially constant current in the three circuits. The gate slew is electrically connected to each field effect transistor and generates a third signal that indicates whether the field effect transistors are switching. The determining means determines when commutation has terminated by comparing the first signal, the second signal and the third signal.

30 Claims, 6 Drawing Sheets

5,955,851

BRUSHLESS DC MOTOR PWM SCHEME FOR QUIET COMMUTATION

FIELD OF THE INVENTION

This invention relates to a brushless dc motor driver system for quiet commutation from one load winding to another load winding and, more particularly, is directed to altering the rate of change of current in the commutating windings in order to maintain a substantially constant current in the system.

BACKGROUND OF THE INVENTION

The pulse width modulator 300, depicted in FIG. 2, is connected to a circuit system 8. The circuit system 8 comprises at least three sets of upper and lower field effect transistors (fets) and a sense resistor. The modulator 300 commutates (switches) the fets of the system 8. Modulator 300 comprises a peak current detector 310, a one shot device 320, a decoder 330, a commutation detect circuit 340, and a commutation state machine 350.

The peak current detector 310 receives a current signal 28 indicating the total current in system 8. Peak current detector 310 compares the current signal 28 to a predetermined reference signal R. The peak current detector 310 generates a detector signal 312. The detector signal 312 is either a nonpeak signal or a peak signal. The peak signal is generated when the current signal 28 is a predetermined ratio of the reference signal R.

The one shot device 320 receives the detector signal 312. The one shot device is a multivibrator that generates a pulse output 322. When the one shot device 320 receives the peak signal the device 320 generates a pulse 322. The pulse is about 1 microsecond long.

The decoder 330 comprises a PWM input that receives pulse 322 and 3 H inputs (H1, H2 and H3) that control the commutation of the fets. When decoder 330 receives the pulse 322 PWM is set to high. When PWM is high, the current in the circuit system 8 ramps down. The time during ramp down is known as off-time because the gate of the pulse width modulating fet is off. Once the pulse 322 concludes PWM reverts to low and the current in the circuit system ramps up (otherwise known as on-time) because the pulse width modulating fet is on.

Commutation is defined as routing current from one phase to another phase. An upper commutation involves the upper fets in 2 phases and a lower commutation involves the lower fets in 2 phases. During commutation the current cannot pass through both fets of the same circuit. A three phase system has six states of commutation for the six fets.

Commutation occurs when commutation detector 340 generates a commutation pulse 342. The commutation state machine 350, electrically connected to the decoder 330 and the commutation detector 340, receives the commutation pulse 342 and then initiates commutation by generating a signal 356 to decoder 330. The machine 350, in conjunction with H1, H2, H3, commutates the fets in revolution. A revolution is when each of the six states of commutation occurs before repeating one of the six states. During commutation the one shot device 320 generates the one microsecond pulse during the off time of the fets.

Commutation with the prior art pulse width modulator on a brushless dc motor driver system has a dip in the total current of the system. A dip in current occurs because the current in the load winding being commutated (switched off) drops faster than the current rising in the load winding that is commutating (switched on). Various pulse width modulators have been used in the past to control that dip with little success.

When the total current dips, a torque ripple can result in mechanical vibrations that are audible. In a typical motor such as one in a computer disk drive, the noise of the vibration is not only annoying, but may also corrupt data written to the disk or lead to premature failure of the disk drive.

An object of the present invention is to prevent that dip in the current of a load driver system during commutation. A further objective is to provide a quieter disk drive with a longer life and more accurate data storage.

SUMMARY OF THE INVENTION

The present invention is a brushless dc motor driver system for quiet commutation of current from one load winding to another load winding. The system comprises a first circuit, a second circuit and a third circuit. Each circuit comprises an upper field effect transistor connected at one end to a voltage source and at its other end to a junction of a corresponding lower field effect transistor and a load. The system further comprises a resistor electrically connected to each lower transistor. The resistor generates a signal representative of the total current of the three circuits. The system also comprises a pulse width modulator electrically connected to each field effect transistor. The modulator controls the commutation system. The modulator comprises a comparing means, a responsive means, a gate slew and a determining means. The comparing means measures the total current signal to a reference signal and generates a first signal that indicates whether the total current signal exceeds a predetermined ratio to the reference signal. The responsive means responds to the first signal and generates a second signal that indicates whether the system is commutating. The second signal also maintains a substantially constant current in the three circuits. The gate slew is electrically connected to each field effect transistor and generates a third signal that indicates whether the field effect transistors are switching. The determining means determines when commutation has terminated by comparing the first signal, the second signal and the third signal.

DETAILED DESCRIPTION OF THE INVENTION

Figure 1:
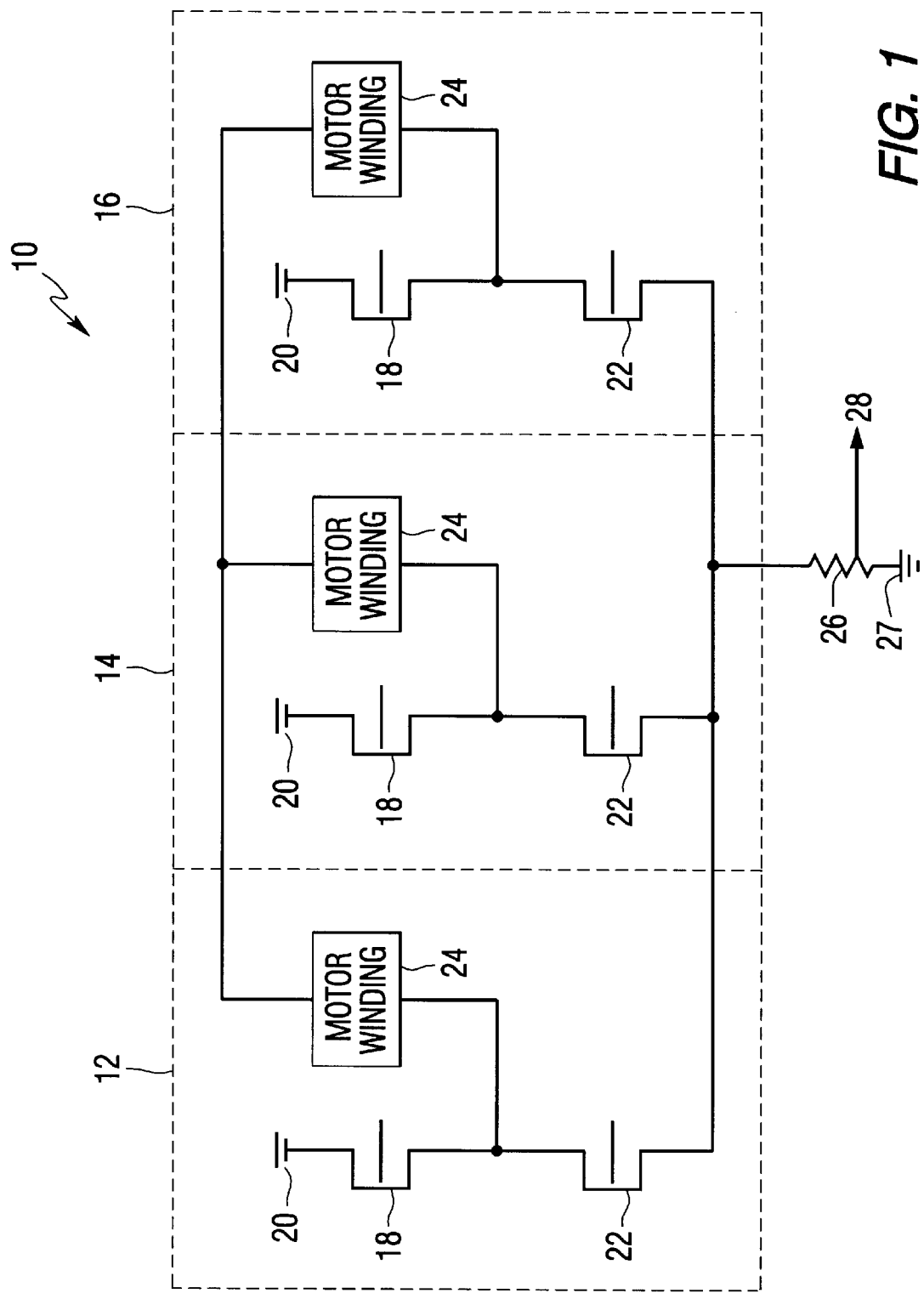
FIG. 1 is a schematic of the system.
Figure 2:
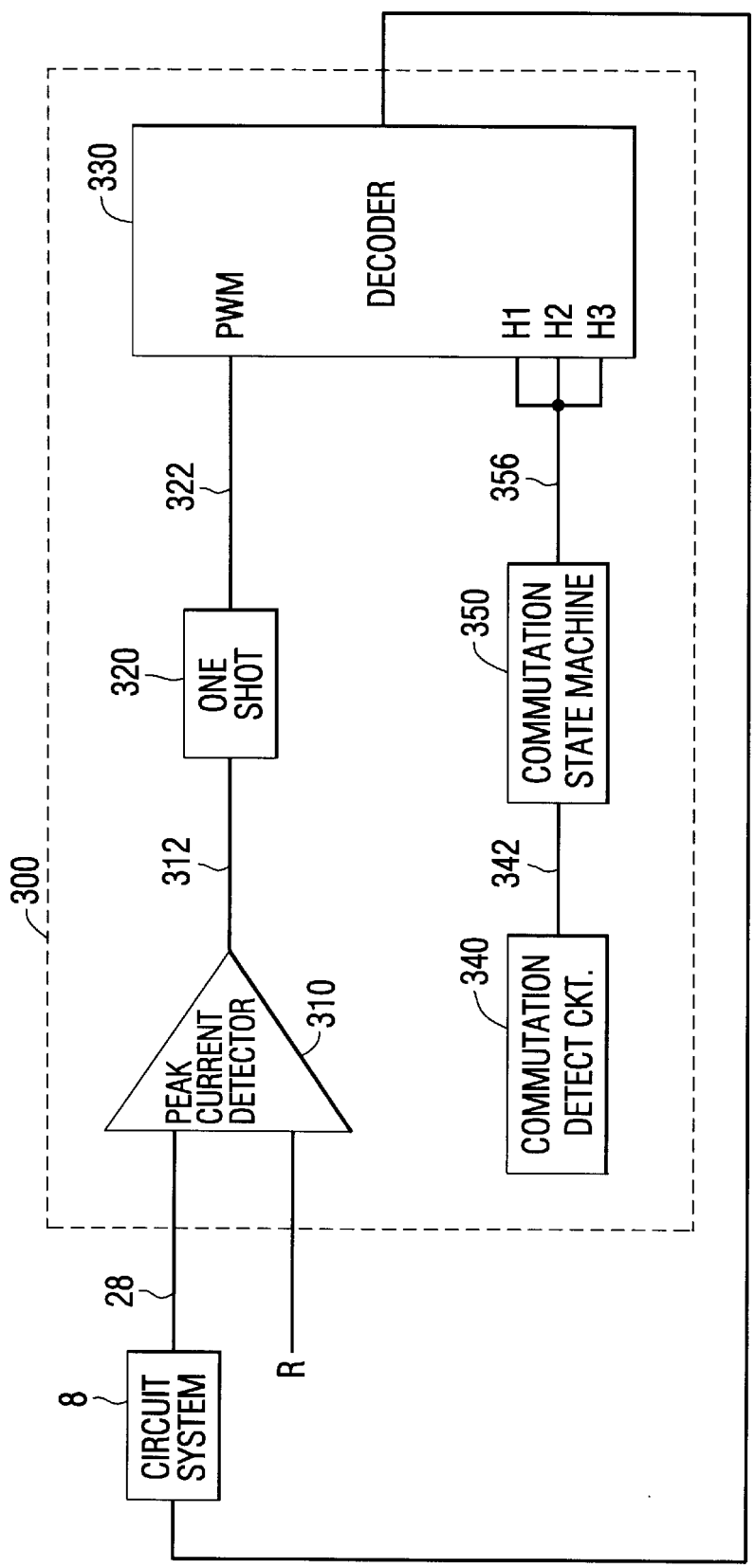
FIG. 2 is a schematic of a Prior Art Pulse Width Modulator.

FIG. 1 shows a brushless dc motor driver system 10. System 10 comprises a first circuit 12, a second circuit 14 and a third circuit 16.

Each circuit 12, 14, 16 comprises an upper field effect transistor (fet) 18 for example a PMOS device. Fet 18 is connected at one end to a voltage source 20 and at its other end to a junction of a corresponding lower fet 22, such as a NMOS device, and a load terminal of a motor winding 24. Winding 24 can be any type of load requiring an electrical current to drive it, such as a motor winding. The lower fet 22 of each circuit is connected to a sense resistor 26 and further to a ground 27. Resistor 26 generates a current signal 28 representative of the total current through the three circuits 12, 14, 16.

Figure 3:
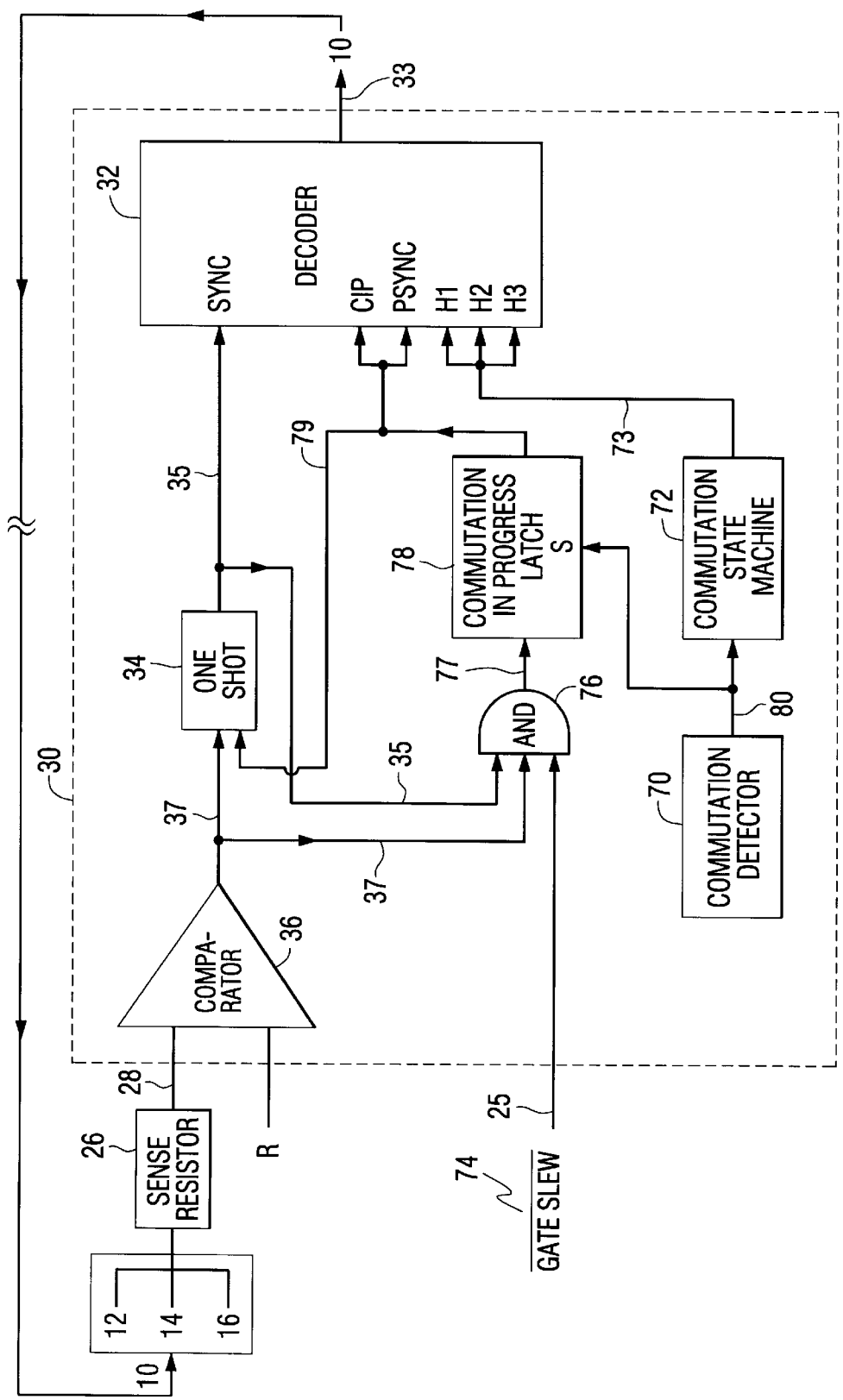
FIG. 3 is a schematic of a Pulse Width Modulator of the present invention.

Turning to FIG. 3, a novel pulse width modulator 30 is shown. Pulse width modulator 30 provides quiet commutation of current from one transistor to another transistor in system 10. Pulse width modulator 30 comprises a decoder means 32, a one shot device 34, a comparator 36, a commutation detector 70, a commutation state machine 72, a gate slew detector 74, an AND gate 76, and a commutation-in-progress latch 78.

FIG. 3 illustrates the electrical connections within the modulator 30 and between the modulator 30 and system 10. The comparator 36 is a peak detector that receives and compares the current signal 28 to the reference signal R and generates a digital signal 37 (371 and 372). The one shot device 34 receives detector signal 37 and generates an output pulse 35 (351 and 352). Decoder 32 at SYNC input receives pulse 35. Gate slew detector 74, electrically connected to fets 18 and 22 of system 10, generates a signal 75 (751 and 752). Commutation detector 70 generates a microsecond pulse 80 when commutation commences. Commutation state machine 72 receives the microsecond pulse 80 and generates a signal 73 that decoder 32 receives at H1, H2, and H3 inputs. AND gate 76 receives signal 75 from gate slew detector 74, detector signal 37 from comparator 36, and pulse 35 from one shot device 34 and generates a signal 77 (771 and 772). CIP latch 78 receives the signal 77 and the microsecond pulse 80 and generates a CIP signal 79 (791, 792, and 793). One shot device 34 and decoder 32, at PSYNC input and CIP input, receive CIP signal 79. Decoder 32 generates a signal 33 that controls the commutation of the various fets $18_{12}$, $18_{14}$, $18_{16}$, $22_{12}$, $22_{14}$, and $22_{16}$ of system 10.

PSYNC in decoder 32 determines if a PMOS or NMOS fet (18 or 22) is being switched in a synchronous manner. If a fet has current in its body diode, the fet is turned on to reduce power dissipation in the fet. Each time signal 35 changes, i.e., from LOW to HIGH (respectfully designated at 351 and 352 in FIG. 5), PSYNC also changes. PSYNC changes from UPPER to LOWER or LOWER to UPPER. When PSYNC is UPPER, the PMOS is being switched synchronously, when LOWER, the NMOS is switched synchronously.

Figure 4:
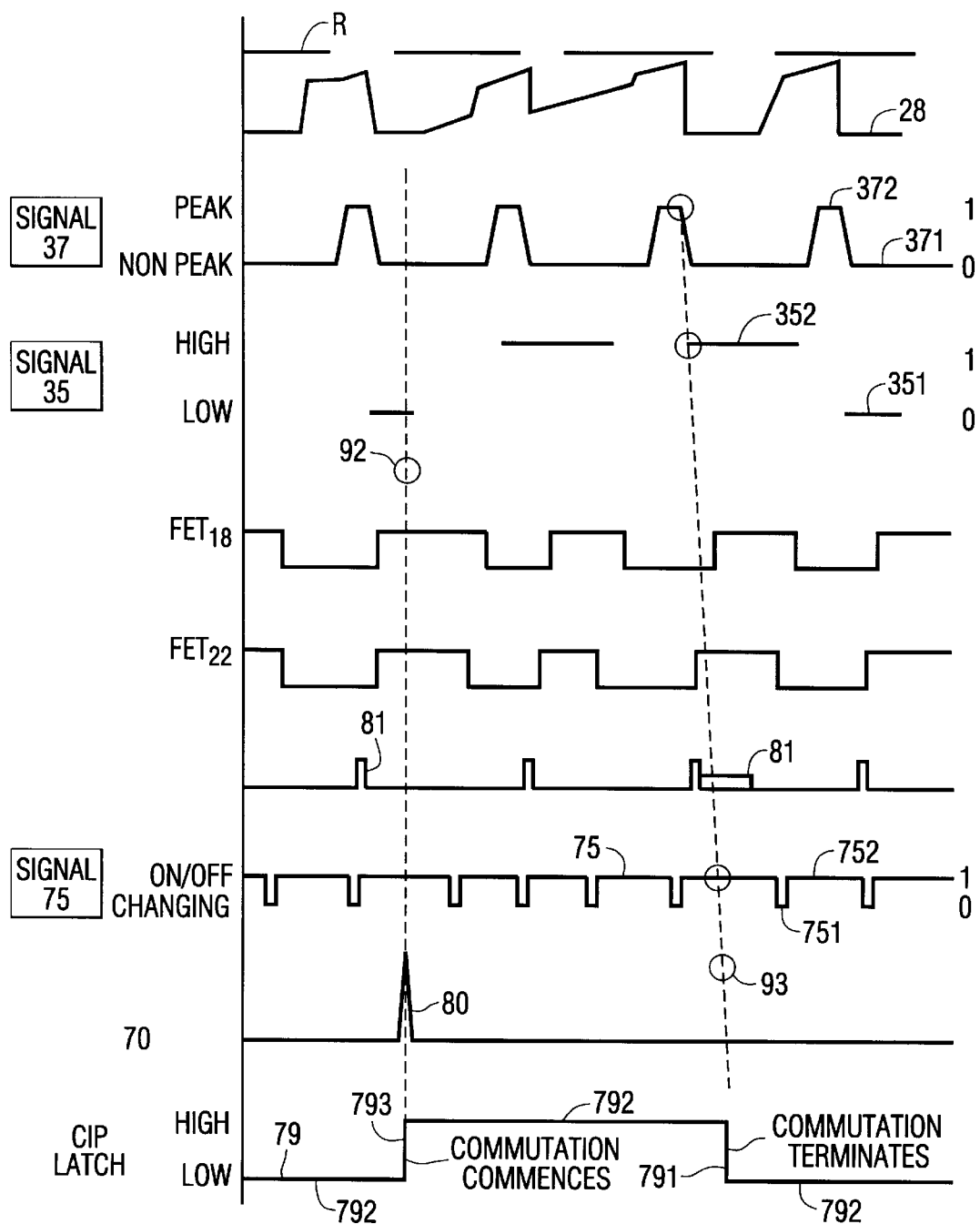
FIG. 4 is a graph of the signals received and generated by the components in the FIG. 3 over a time period of one commutation.
Figure 5:
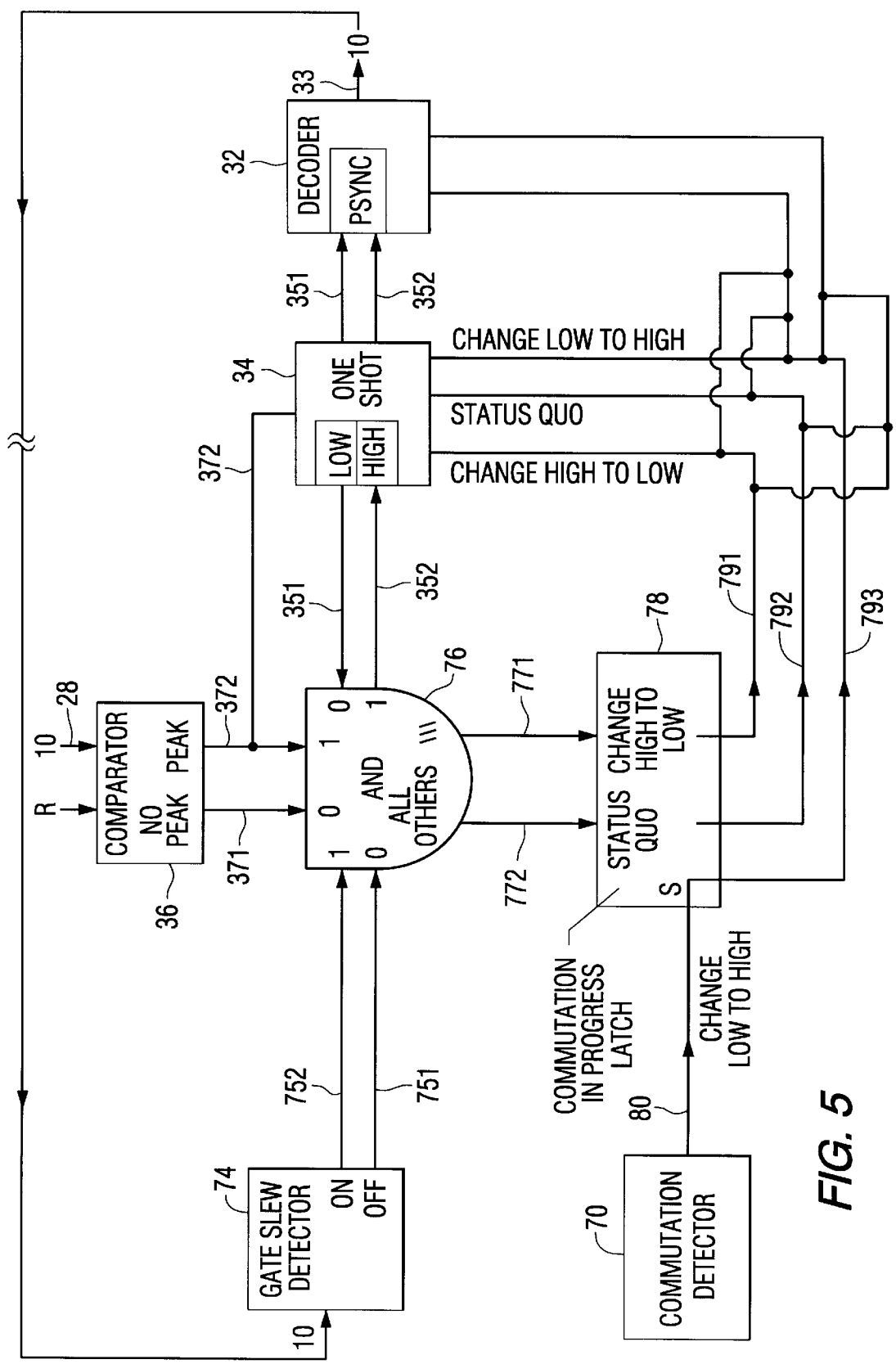
FIG. 5 is a schematic of FIG. 3 in view of FIG. 4.

FIG. 4 illustrates each signal received or generated in the pulse width modulator 30 (excluding signal 73 from commutation in state machine 72) over a time period of one commutation and FIG. 5 schematically illustrates FIG. 3 in view of FIG. 4. Detector signal 37 from comparator 36 is either a non-peak signal (zero) 371 or a peak signal (one) 372. The comparator generates the peak signal 372 when the current signal 28 is a predetermined ratio of the reference signal R, such as exceeding signal R. The reference signal R can be any predetermined voltage such as 100 millivolts.

One shot device 34 is a one shot multivibrator and generates an output 35 upon receipt of the peak signal 372. Unlike other one shot devices, one shot device 34 generates two different pulse widths 35. Between commutations, the pulse width to is about one microsecond (351 and LOW). During a commutation, to keep the switching frequency relatively constant, the pulse width is two to six times longer, preferably two to four times longer (352 and HIGH). The duration of the commutation is indicated by signal 79 (output of CIP latch 78) being high.

When the pulse 35 from one shot 34 is high 352, SYNC input is HIGH and decoder 32 decodes the appropriate state on the gate drivers of the fets so the current in the load 24 ramps down to control the current through the system 10. When one shot device output pulse 35 terminates, the SYNC input is LOW until comparator 36 generates another peak signal. At SYNC equal to LOW, the synchronous fets are turned off and the pulse width modulator fets are turned on.

Figure 6:
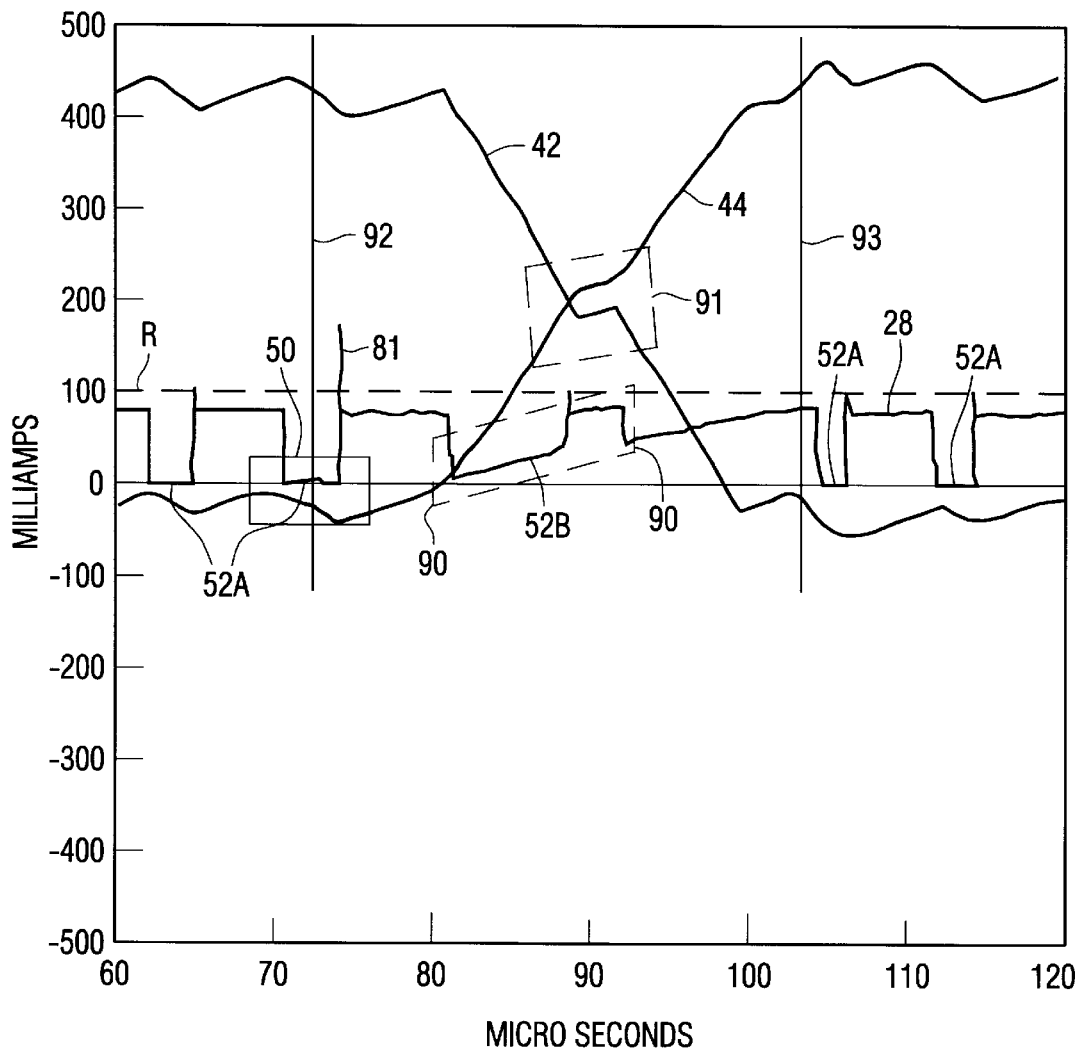
FIG. 6 is a graph representing the current in each circuit of the system.

When the pulse width modulator fets 18, 22 are turned on, an undesired high pulse 81 of current flows through the fets (also illustrated in FIG. 6). The gate slew detector 74, electrically connected to the gate drivers of the fets, generates a signal 75 to control pulse 81. The gate slew signal 75 switches to a low state 751 when a fet is turned on or off and to a high state 752 when the fet is operating or not operating. This way the noise associated with switching is blanked from the peak detector 36.

Commutation initiates when commutation detector 70 generates a very short microsecond pulse 80. Commutation state machine 72 (only shown in FIG. 3) and CIP latch 78 receive pulse 80. Upon receipt of pulse 80 CIP latch 78 is set to HIGH and generates CIP signal 79 (designated as 793) to set the status of one shot device 34 to the long pulse width signal 352.

Commutation terminates 93 when the AND gate 76 receives three input signals all designated a "one" (or HIGH) at the same time from the slew gate device 74 (signal 752), the comparator 36 (signal 372), and the one shot device 34 (signal 352). When all its inputs are "ones" AND gate generates output signal 77 (designated as 771) that alters the state of the CIP latch 78 from HIGH to LOW. By changing the state of the CIP latch 78, the CIP latch generates CIP signal 79 (designated as 791) to change the status of one shot device 34 from HIGH to LOW. One shot device 34 receives the CIP signal 791 and generates the short pulse width signal 351.

On the other hand, commutation is not terminated or initiated when AND gate receives three signals that are not all designated "ones" (or HIGH) at the same time from the slew gate device 74, the comparator 36, and the one shot device 34. When its inputs are not all "ones" AND gate 76 generates a low signal 77 (designated as 772) that will retain the status quo of the state for the CIP latch 78. The CIP latch 78 then generates the signal 79 (designated as 792) to maintain the status of the one shot device 34. The one shot device 34 maintains its HIGH or LOW state and generates the respective pulse 351 or 352.

As shown in FIG. 6, the rate of change is illustrated at area referenced as 90 on the voltage signal 28. This rate of change is altered by one shot device 34 that alters the falling rate of a commutated circuit 42 and the rising rate of a commutating circuit 44. This rate change is most evident at area referenced as 91. While the one shot is occurring 52 B, the off time of the commutation is two to six times longer in duration than the off time not during commutation 52 A. This longer off-time decreases the undesirable current dip.

System 10 operates under the premise that upper fet 18 and lower fet 22 of the same circuit 12, 14, or 16 do not operate at the same time. If they were both on at the same time excessive current would flow through them burning them up.

The invention has been described in detail with particular reference to certain preferred embodiments thereof, but it will be understood that variations and modifications can be effected within the spirit and scope of the invention.

What is claimed is:

1. A load driver system for quiet commutation of current from one load phase to another load phase comprising:

three circuits, each circuit comprising an upper field effect transistor connected at one end to a voltage source and at its other end to a junction of a corresponding lower field effect transistor and a load wherein the upper and lower field effect transistor of the same circuit are not on at the same time;

a resistor electrically connected to each lower transistor generates a signal representative of the total current of the three circuits:

a pulse width modulator electrically connected to each field effect transistor and controlling the commutation system, the modulator comprising:

means for comparing the total current signal to a reference signal and generating a first signal that indicates whether said total current signal exceeds a predetermined ratio to said reference signal; and a one shot device, responsive to said first signal, that generates a second signal indicating whether the system is commutating and maintaining a substantially constant current in the three circuits when the current in one of the load windings is ramping down;

wherein one shot device further comprises means for delaying the fall in current in one of the commutated circuits.

2. The system of claim 1 further comprising a gate slew detector connected to each field effect transistor that generates a third signal for indicating whether the field effect transistors are switching.

3. The system of claim 2 further comprising means for determining when commutation has terminated by comparing the first signal, the second signal and the third signal.

4. The system of claim 3 wherein said determining means further comprises an AND gate that receives the first signal, the second signal and the third signal to generate a fourth signal; and latch means for receiving said fourth signal and a fifth signal from a commutation detector, and generating a sixth signal that alters the state of the one shot device when commutation has terminated or commenced.

5. The system of claim 3 wherein the first, second and third signals are binary signals having first and second states, the second state is designated for commutation, and commutation terminates when the first signal, the second signal and the third signal are all in the second state in the determining means at the same time.

6. The system of claim 1 further comprising commutating means for commutating one transistor in one circuit to another transistor in another circuit wherein the one transistor in one circuit is the upper field effect transistor and is commutated only with another upper field effect transistor in another circuit.

7. The system of claim 1 wherein the second signal not during commutation of any field effect transistor is about one microsecond.

8. The system of claim 1 wherein the second signal during commutation of any field effect transistor is two to six times longer in duration than the second signal not during commutation.

9. The system of claim 1 further comprising commutating means for commutating one transistor in one circuit to another transistor in another circuit wherein the one transistor in one circuit is the low field effect transistor and is commutated only with another lower field effect transistor and its commutated only with another lower field effect transistor in another circuit.

10. The system of claim 1 wherein the commutation alternates between upper field effect transistor and lower field effect transistor.

11. A motor driver system for quiet commutation from one transistor to another transistor comprising first, second and third circuits, each circuit comprising an upper field effect transistor connected at one end to a voltage source and at its other end to a junction of a corresponding lower field effect transistor and a motor winding terminal and wherein the upper and lower field effect transistors of the same circuit do not operate at the same time;

a resistor electrically connected to each lower transistor for measuring the voltage drop across said resistor, and generating a signal representative of the total current of the three circuits;

a pulse width modulator electrically connected to each field effect transistor and controlling the commutation system, the modulator comprising means for comparing the total current signal to a reference signal and generating a first signal that indicates whether said total current signal exceeds a predetermined ratio to said reference signal;

a commutator detector that generates a second signal;

a one shot device, responsive to said first signal, that generates a third signal for maintaining a substantially constant current in the three circuits during commutation;

a gate slew detector connected to each field effect transistor that generates a fourth signal for indicating whether the field effect transistors are switching;

an AND gate that receives and compares the first signal, the third signal and the fourth signal to determine whether the commutation has terminated and generates a fifth signal; and means for latching that receives said second signal and said fifth signal and generates a sixth signal in response to said second signal and fifth signal that alters the state of the one shot device when commutation has commenced or terminated.

12. The system of claim 11 further comprising commutating means for commutating one transistor in one circuit to another transistor in another circuit wherein the one transistor in one circuit is the lower field effect transistor and is commutated only with another lower field effect transistor in another circuit.

13. The system of claim 11 further comprising commutating means for commutating one transistor in one circuit to another transistor in another circuit wherein the one transistor in one circuit is the upper field effect transistor and is commutated only with another upper field effect transistor in another circuit.

14. The system of claim 11 further comprising commutating means for commutating one transistor in one circuit to another transistor in another circuit wherein the one transistor in one circuit is the upper field effect transistor and is commutated only with another upper field effect transistor in another circuit.

15. The system of claim 11 wherein the third signal is generated in response to the first signal.

16. The system of claim 15 wherein the third signal during commutation is two to six times longer in duration than the third signal not during commutation.

17. The system of claim 11 wherein commutation terminates when the first signal, the third signal and the fourth signal are all designated as "ones" in the AND gate.

18. The system of claim 17 wherein the designation "one" occurs when the first signal indicates the total current signal exceeds the predetermined ratio to the reference signal, the third signal indicates that commutation is occurring and the field effect transistors are off-time, and the fourth signal indicates the field effect transistor are not switching.

19. The system of claim 11 wherein commutation alternates between upper field effect transistor and lower field effect transistor.

20. In a load driver system, a method for quiet commutation of current from one transistor to another transistor in three interconnected circuits having a lower and upper field effect transistors (fets) each upper field effect transistor connected at one end to a voltage source and at its other end to a junction of a corresponding load and the lower field effect transistor comprising the steps of measuring the voltage drop across a resistor electrically connected to first, second, and third lower field effect transistors; in three interconnecting circuits having a lower and upper field effect transistors;

commutating the current from one of said upper or lower fets to a corresponding other upper or lower fet;

generating a first signal representative of the total current in the three circuits;

generating a second signal for altering the rate of change of current in a commutated circuit in order to maintain a substantially constant current in the three circuits;

generating a third signal representative of whether the field effect transistors are switching; and comparing the first signal, the second signal and the third signal to determine if commutation has commenced and generating a fourth signal in response to the comparison.

21. The method of claim 20 wherein said second signal is a binary signal having first and second states and further comprising the step of altering the second signal from the first state to the second state when commutation commences.

22. The method of claim 20 wherein said second signal is a binary signal having first and second states and further comprising the step of altering the second signal from the second state to the first state when commutation terminates.

23. The method of claim 20 wherein the one transistor is a lower field effect transistor and is commutated only with another lower field effect transistor.

24. The method of claim 20 wherein the one transistor is a upper field effect transistor and is commutated only with another upper field effect transistor.

25. The method of claim 20 wherein the second signal is generated in response to the first signal.

26. The method of claim 25 wherein the second signal during commutation is two to six times longer in duration than the second signal not during commutation.

27. The method of claim 20 wherein the first, second and third signals are binary signals having first and second states and commutation terminates when the first signal, the second signal and the third signal are all in the second state at the same time when being compared.

28. The method of claim 27 wherein the second state of the first signal indicates the total current exceeds a predetermined ratio to a reference signal, a second state of the second signal indicates that commutation is occurring and the field effect transistors are off-time, and a second state of the third signal indicates the field effect transistor are not switching.

29. The method of claim 20 wherein commutating alternates between upper field effect transistor and lower field effect transistor.

30. The method of claim 20 wherein the load terminal is adapted to be connected to a motor winding.

* * * * *

UNITED STATES PATENT AND TRADEMARK OFFICE
CERTIFICATE OF CORRECTION

PATENT NO. : 5,955,851
DATED : September 21, 1999
INVENTOR(S) : SOLIE, Eric M.; WILLIAMS, Robert A.

It is certified that error appears in the above-identified patent and that said Letters Patent is hereby corrected as shown below:

On the patent cover page:

At Item [73] after "Harris Corporation, Melbourne, Fla." insert ---; Celestica International Inc., North York, Ontario, Canada ---.

Signed and Sealed this

Fifteenth Day of August, 2000

Attest:

Q. TODD DICKINSON

*Attesting Officer*  *Director of Patents and Trademarks*